United States Patent [19]
Miyata

Patent Number: 5,466,740
Date of Patent: Nov. 14, 1995

[54] STABILIZED, HALOGEN-CONTAINING RESIN COMPOSITION, AND COMPOSITE METAL OXIDE AND PROCESS FOR THE PRODUCTION THEREOF

[75] Inventor: Shigeo Miyata, Kagawa, Japan

[73] Assignee: Kabushiki Kaisha Kaisui Kagaku Kenkyojo, Fukuoka, Japan

[21] Appl. No.: 238,021

[22] Filed: May 3, 1994

[30] Foreign Application Priority Data

May 6, 1993 [JP] Japan .................. 5-129925

[51] Int. Cl.⁶ .................. C08K 3/22; C01G 49/00
[52] U.S. Cl. .................. 524/399; 423/592; 423/594; 423/599; 524/357; 524/413; 524/435; 524/436; 524/437
[58] Field of Search .................. 524/413, 434, 524/435, 436, 357, 399; 423/592, 594, 599

[56] References Cited

U.S. PATENT DOCUMENTS

| 2,944,045 | 7/1960 | Canarios. | |
| 3,607,863 | 9/1971 | Dosch | 423/594 |
| 4,360,624 | 11/1982 | Huang et al. | 524/411 |
| 4,403,060 | 9/1983 | Netherton et al. | 524/435 |
| 5,100,659 | 3/1992 | Kurihara et al. | 423/593 |
| 5,326,549 | 7/1994 | Miyata | 423/594 |

FOREIGN PATENT DOCUMENTS

| 2435495 | 4/1980 | European Pat. Off.. |
| 0256872 | 2/1988 | European Pat. Off.. |
| 0432495 | 6/1991 | European Pat. Off.. |
| 498566 | 8/1992 | European Pat. Off.. |
| 517448 | 12/1992 | European Pat. Off.. |
| 0541329 | 5/1993 | European Pat. Off.. |
| 40-3179049 | 8/1991 | Japan. |

Primary Examiner—Veronica P. Hoke
Attorney, Agent, or Firm—Wenderoth, Lind & Ponack

[57] ABSTRACT

A halogen-containing resin composition made stable to heat and light, by incorporating (a) a calcium-based composite metal hydroxide of the formula (1), $$Ca_{1-x}M^{2+}{}_x(OH)_2 \qquad (1)$$

wherein $M^{2+}$ is $Mg^{2+}$, $Mn^{2+}$, $Fe^{2+}$, $Co^{2+}$, $Ni^{2+}$ and $Zn^{2+}$ and x is a number in the range of $0.005<x<0.5$
and a calcium-based composite metal oxide of the formula (2)m, $$Ca_{1-x}M^{2+}{}_xO \qquad (2)$$

wherein $M^{2+}$ and x are as defined in the formula (1), (b) a β-diketone compound or metal salt thereof, and optionally (c) an organic acid salt of zinc.

8 Claims, No Drawings

STABILIZED, HALOGEN-CONTAINING RESIN COMPOSITION, AND COMPOSITE METAL OXIDE AND PROCESS FOR THE PRODUCTION THEREOF

FIELD OF THE INVENTION

The present invention relates to a stabilized, halogen-containing resin composition containing a calcium compound, a novel composite metal oxide which is a calcium oxide-containing solid solution, and a process for the production of said composite metal oxide. More specifically, it relates to a halogen-containing resin composition excellent in heat resistance, chalking resistance, initial coloring properties and nontoxicity, a calcium-based composite metal oxide useful for providing said halogen-containing resin composition, and a process for the production of said composite metal oxide.

PRIOR ART OF THE INVENTION

A halogen-containing resin is unstable to heat and light, and a variety of so-called heat stabilizers are hence used. As the heat stabilizers, there are known lead compounds, organic tin compounds and composite organic acid salts such as Cd/Ba compounds, Ba/Zn compounds and Ca/Zn compounds.

The toxicity of heat stabilizers and their global environmental pollution are issues which have attracted attention in recent years, and almost all of Cd, Pb, Ba and Sn compounds have been taken as problems. It is hence increasingly requested to develop a nontoxic safe stabilizer. A Ca/Zn composite fatty acid salt is now remaining as a nontoxic stabilizer. The problem of this Ca/Zn fatty acid salt is that it is poor in the improvement of a halogen-containing resin in heat stability, and the replacement of the toxic stabilizers with a nontoxic stabilizer is still narrowly limited at present.

On the other hand, it is known that a Cu compound exhibits excellent chalking resistance when incorporated into a halogen-containing resin. However, it cannot be used for that purpose, since it greatly deteriorates the heat resistance of a halogen-containing resin, It is therefore strongly desired to develop a nontoxic Cu-based stabilizer which can greatly improve a halogen-containing resin in heat stability and a Cu-based stabilizer which does not impair the heat stability.

SUMMARY OF THE INVENTION

It is an object of the present invention to provide halogen-containing resin composition stable to heat and light.

It is another object of the present invention to provide a composite metal oxide which is a novel calcium oxide-containing solid solution, and a process for the production of said composite metal oxide.

It is further another object of the present invention to provide a composite metal oxide which is a novel stabilizer useful for providing a halogen-containing resin composition excellent in heat stability.

According to the present invention, there is provided a halogen-containing resin composition comprising (a) 0.1 to 10 parts by weight of at least one of a calcium-based composite metal hydroxide of the formula (1), $$Ca_{1-x}M^{2+}_x(OH)_2 \qquad (1)$$

wherein $M^{2+}$ is at least one divalent metal ion selected from the group consisting of $Mg^{2+}$, $Mn^{2+}$, $Fe^{2+}$, $Co^{2+}$, $Ni^{2+}$, $Cu^{2+}$ and $Zn^{2+}$ and x is a number in the range of $0.005<x<0.5$ and a calcium-based composite metal oxide of the formula (2), $$Ca_{1-x}M^{2+}_xO \qquad (2)$$

wherein $M^{2+}$ and x are as defined in the formula (1), (b) 0.01 to 2 parts by weight of a β-diketone compound or a metal salt thereof, (c) 0 to 2 parts by weight of an organic acid salt of zinc, and (d) 100 parts by weight of a halogen-containing resin.

Further, according to the present invention, there is provided a composite metal oxide which is a calcium oxide-containing sol id solution having the formula (2), $$Ca_{1-x}M^{2+}_xO \qquad (2)$$

wherein $M^{2+}$ is at least one divalent metal ion selected from the group consisting of $Mg^{2+}$, $Mn^{2+}$, $Fe^{2+}$, $Co^{2+}$, $Ni^{2+}$, $Cu^{2+}$ and $Zn^{2+}$ and x is a number in the range of $0.005<x<0.5$ and having a BET specific surface area ranging from 5 to 300 m²/g. Furthermore, according to the present invention, there is provided a process for the production of a composite metal oxide which is a calcium oxide-containing sol id solution of the formula (2), wherein $M^{2+}$ is at least one divalent metal ion selected from the group consisting of $Mg^{2+}$, $Mn^{2+}$, $Fe^{2+}$, $Co^{2+}$, $Ni^{2+}$, $Cu^{2+}$ and $Zn^{2+}$ and $Zn^{2+}$ and x is a number in the range of $0.005<x<0.5$ which comprises calcining a calcium hydroxide-containing sol id solution of tile formula (1), $$Ca_{1-x}M^{2+}_x(OH)_2 \qquad (1)$$

wherein $M^{2+}$ and x are as defined in the formula (2), at a temperature between 400° C. and 1,100° C.

DETAILED DESCRIPTION OF THE INVENTION

The above halogen-containing resin composition according to the present invention has remarkably excellent heat stability over a halogen-containing resin composition containing a Ca/Zn composite fatty acid salt, and it also has excel lent initial coloring properties.

The above composite metal oxide which is a calcium oxide-containing solid solution, provided by the present invention, has not only excellent heat stability but also remarkably excellent storage stability over calcium oxide.

Conventionally, a Cu component cannot be used since it greatly impairs the heat stability of a halogen-containing resin, while the Cu component can be contained in the compounds of the formulae (1) and (2) according to the present invention. That is, the compounds of the formulae (1) and (2) are excellent as heat stabilizers for halogen-containing resins, and at the same time exhibit excellent chalklog resistance inherent to the Cu component without having any adverse effect on the halogen-containing resins.

The present invention will be detailed hereinafter.

The compound of the formula (1) is the novel compound which the present invention has already invented (Japanese Patent Application No. 319827/1991). The calcium-containing composite metal hydroxide of tile formula (1) has the same crystal structure as that of $Ca(OH)_2$, and yet it is a solid solution in which divalent metals such as Zn, Cu and the like have partially replaced Ca. The calcium hydroxide-based solid solution of the formula (1) fully exhibits its performances when it has a crystal grain size of approximately 0.1 to 3 μm, preferably approximately 0.1 to 1.0 μm and is almost free of aggregation. In other words, it is preferred to use the calcium hydroxide-based solid solution of which the average secondary particle diameter is approximately 0.1 to 3 μm, preferably approximately 0.1 to 1 μm and the BET specific surface area is at least 5 m$^2$/g, particularly preferably at least 10 m$^2$/g.

The calcium oxide-based solid solution of the formula (2) is a solid solution of M$^{22+}$O in CaO. M$^{2+}$ is at least one divalent metal ion selected Mn$^{2+}$, Mn$^{2+}$, Fe$^{2+}$, Co$^{2+}$, Ni$^{2+}$, Cu$^{2+}$ and Zn$^{2+}$. Of these, Mg$^{2+}$, Mn$^{2+}$, Ni$^{2+}$, Cu$^{2+}$ and Zn$^{2+}$ are preferred, and Mg$^{2+}$, Cu$^{2+}$, Zn$^{2+}$ are particularly preferred. Mn$^{2+}$ and Ni$^{2+}$ are excellent in imparting calcium oxide with carbonization resistance and hydrolysis resistance, and Ni$^{2+}$ is particularly excellent in this point. Mg$^{2+}$ is excellent in whiteness, basicity and nontoxicity. Zn$^{2+}$ excellent not only in the improvement of whiteness and nontoxicity but also in providing a halogen-containing resin having initial coloring properties, heat stability and resistance to ultraviolet light as a heat stabilizer. Cu$^{2+}$ is excellent in providing a halogen-containing resin composition having initial coloring properties, heat stability and chalking resistance.

The range of x is $0.005 < x < 0.5$, preferably $0.01 \leq x \leq 0.4$, particularly preferably $0.02 \leq x \leq 0.2$. The calcium oxide-based solid solution of the formula (2) fully exhibits its performances when it has a crystal grain size of 0.1 to 3 μm, preferably 0.1 to 1.0 μm, an average secondary particle diameter of 0.1 to 3 μm, preferably 0.1 to 1 μm (which shows almost no occurrence of aggregation) and a BET specific surface area of at least 5 m$^2$g, preferably at least 10 m$^2$/g, particularly preferably at least 15 m$^2$/g.

In the present invention, the calcium hydroxide-based solid solution of the formula (1) and the calcium oxide-based solid solution of the formula (2) can be directly used as they are produced, while it is preferred to surface-treat them with a surface-treating agent for allowing them to exhibit the effects of the present invention. The surface-treating agent is selected from higher fatty acid salts, phosphate esters, silane-, titanium and aluminum-coupling agents, esters of polyhydric alcohols and fatty acids, and metal salts of higher fatty acids. Specific examples of the surface treating agent include higher fatty acids having at least 10 carbon atoms such as stearic acid, oleic acid, erucic acid, palmitic acid, lauric acid and behenic acid; alkali metal salts of these higher fatty acids; sulfuric acid esters of higher alcohols such as stearyl alcohol and oleyl alcohol; artionic surfactants such as sulfuric acid ester of polyethylene glycol ether, amidated sulfuric acid ester, esterified sulfuric acid ester salt, esterified sulfonate, amidated sulfonic acid salt, etherified sulfonic acid salt, etherified alkylallylsulfonic acid salt, esterified alkylallylsulfonic acid salt and amidated alkylallyl sulfonic acid salt; phosphate esters such as stearyl acid phosphate and sodium oleyl phosphate, partially esterified products of orthophosphoric acid such as mono- or diesters from orthophosphoric acid and stearyl alcohol and partially esterified products from orthophosphoric acid, an alkali metal salt or amine salt; silane-coupling agents such as vinylethoxysilane, vinyltris(2-methoxy-ethoxy) silane, gamma-methacryloxypropyltrimethoxysilane, gamma-aminopropyl trimethoxysilane, beta-(3,4-epoxycyclohexyl)ethyltrimethoxysilane, gamma-glycidoxypropyltrimethoxysilane and gamma-mercaptopropyltrimethoxysilane; titanate-containing coupling agents such as isopropyltriisostearoyltitanate, isopropyltris(dioctylpyrophosphate)titanate, isopropyltri(N-aminoethyl-aminoethyl)titanate and isopropyltridecylbenzenesulfonyl titanate; aluminum-containing coupling agents such as acetoalkoxyaluminum diisopropylate; and esters of polyhydric alcohols and fatty acids such as glycerin monostearate and glycerin monooleate.

The calcium compounds of the formulae (1) and (2) can be surface-treated by a conventionally known method. For example, tile calcium compound of the formula (1) can be surface-treated by a method in which the above surface-treating agent in a liquid or emulsion state is added to a slurry of the calcium compound and then fully mechanically mixed with the calcium compound at a temperature up to about 100° C. The calcium compound of the formula (1) or (2) can be surface-treated by a method in which the above surface-treating agent in an as-produced state or in a liquid, emulsion or solid state after it is diluted or dissolved in a proper solvent is added to a powder of the calcium compound while the calcium compound is stirred at a high rate with a mixing apparatus such as a tlenschel mixer, and fully mixed with the calcium compound under heat or without heating. The amount of the surface-treating agent is determined as required, while it is preferably approximately. 0.1 to 10 % by weight of the weight of the calcium compound. The surface-treated calcium compound may be washed with water, dehydrated, granulated, dried, pulverized and/or classified properly as required to obtain an end product.

The composite metal hydroxide used in tile present invention can be produced by any one of various methods. For example, it can be produced by a co-precipitation method in which an alkali is added to an aqueous solution of Ca$^{2+}$ ion and M$^{2+}$ ion with stirring in such amounts that the amount of the alkali is 1 equivalent per equivalent of Ca$^{2+}$ and M$^{2+}$ ion in total to precipitate the composite metal hydroxide. It can be also produced by a method in which calcium oxide and/or calcium hydroxide are/is mixed with an aqueous solution containing M$^{2+}$ ion to allow them to react. Further, it can be produced by a sol-gel method in which calcium and an alcoholate of M$^{2+}$ are hydrolyzed. Furthermore, it can be also produced by a method in which a solid solution of the calcium oxide of the formula (2) and MO is pulverized with a ball mill, or the like and then subjected to a hydration reaction in the co-presence of acetic acid, lactic acid or hydrochloric acid.

For further crystal growth and decreasing secondary aggregation, the composite metal hydroxide produced by any one of the above method may be hydrothermally treated in an autoclave at a temperature approximately between 110° C. and 250° C. for at least about 1 hour while a reaction mother liquor is present or after a salt such as CaCl$_2$, CaBR$_2$, MgCl$_2$, MgBr$_2$, NaCl or KCl is further added as a crystal growth promoter.

The source for providing calcium ion used for the formation of the composite metal hydroxide includes calcium oxide (quick lime), calcium hydroxide (slaked lime), calcium chloride, calcium bromide, calcium iodide, calcium nitrate, calcium acetate and alcoholates such as calcium ethoxide and calcium propoxide. The source for M$^{2+}$ ion includes chlorides, bromides, iodides, nitrates, formates and alcoholates such as butoxides, ethoxides, propoxides and isopropoxides of divalent metals such as Mg$^{2+}$, Mn$^{2+}$, Fe$^{2+}$, Co$^{2+}$, Ni$^{2+}$, Cu$^{2+}$ and Zn$^{2+}$, bittern, seawater and underground brine.

The alkali used for farming the composite metal hydroxide includes sodium hydroxide, potassium hydroxide, calcium hydroxide (natural products or synthetic products), aqueous ammonia and ammonia gas.

The calcium-based composite oxide of the formula (2) can be produced by calcining the calcium-based composite hydroxide of the formula (1) at a temperature between approximately 400° C. and 1,100° C., preferably between approximately 500° C. and 800° C. for approximately 0.1 to 10 hours, preferably for approximately 0.5 to 5 hours, under natural atmosphere or under an atmosphere of nitrogen, helium or argon or in vacuum.

The amount of the compound of tile formula (1) and/or the compound of the formula (2) per 100 parts by weight of the halogen-containing resin is 0.01 to 10 parts by weight, preferably 0.1 to 5 parts by weight.

The β-diketone compound used in the present invention has tile formula (3),

$$R_1-CO-CHR_2-CO-R_3$$

wherein each of $R_1$ and $R_3$ is independently a linear or branched alkyl or alkenyl group having up to 30 carbon atoms, an aryl group or an alicyclic group which may contain a carbon-carbon double bond, one of $R_1$ and $R_3$ may be a hydrogen atom, and $R_2$ is a hydrogen atom, an alkyl group or an alkenyl group.

Specific examples of the above β-diketone compound include dehydroacetic acid, dehydropropionylacetic acid, dehydrobenzoylacetic acid, cyclohexan-1,3-dione, dimedone, 2,2'-methylenebiscyelohexan-1,3-dione, 2-benzyleyclohexan -1,3-dione, acetyltetralone, palmitoyltetralone, stearoyltetralone, benzoyltetralone, acetylcyclohexanone, 2-benzoylcyclohexanone, 2-acetyl-cyclohexanone-1,3-dione, benzoyl-p-chlorobenzoylmethane, bis(4-methylbenzoyl)methane, bis(2-hydroxybenzoyl)methane, benzoylacetylmethane, tribenzoylmethane, diaeetylbenzoylmethane, stearoyl.benzoylmethane, palmitoyl.benzoylmethane, dibenzoylmethane, 4-methoxybenzoyl-benzoylmethoxy, bis(4-chlorobenzoyl)methane, bis(3,4-methylenedioxybenzoyl) methane, bezoyl.acetyl.octylmethane, benzoyl.acetyl.phenylmethane, stearoyl-4-methoxybenzoylmethane, bis(4-t-butylbenzoyl-)methane, benzoyl.acetyl.ethylmethane, benzoyl.trifluoro.acetylmethane, diacetylmethane, butanoyl.acetylmethane, heptanoyl.acetylmethane, triacetylmethane, distearoylmethane, stearoyl.acetylmethane, palmitoyl.acetylmethane, lauroyl.acetylmethane, benzoyl.formylmethane, acetyl.formyl.methylmethane, benzoyl.phenylacetylmethane, and bis(eyelohexanoyl)methane.

A metal salt of any one of the above β-diketone compounds may be also used. The metal includes lithium, sodium, potassium, magnesium, calcium, barium, zinc, zirconlure, tin and aluminum.

Of the above β-diketone compounds, particularly preferred are stearoyl.benzoylmethane and dibenzoylmethane. The amount of the β-diketone compound or the metal salt thereof per 100 parts by weight of the halogen-containing resin is 0.01 to 2 parts by weight, preferably 0.1 to 1 part by weight.

The halogen-containing resin composition of the present invention further contains an organic acid salt of zinc. Specific examples of the organic acid include monofunctional carboxylic acids such as acetic acid, propionic acid, burytic acid, caprole acid, enanthic acid, caprylic acid, neodecanoic acid, 2-ethylhexylic acid, pelargonic acid, captic acid, undecanoic acid, laurie acid., tridecanoic acid, myristic acid, palmitic acid, isostearic acid, stearic acid, 1,2-hydroxystearic acid, behenic acid, montanic acid, benzoic acid, monochlorobenzoic acid, p-t-butylbenzoic acid, dimethylhydroxybenzoic acid, 3,5-di-tert-butyl-4-hydroxybenzoic acid, toluic acid, dimethylbenzoic acid, ethylbenzoic acid, cuminic acid, propylbenzoic acid, aminobenzoic acid, N,N-dimethylbenzoic acid, acetoxybenzoic acid, salicylic acid, p-t-octylsalicylic acid, oleic acid, elaidic acid, linoleic acid, linolenic acid, thioglycolic acid, mercaptopropionic acid and octylmercaptopropionic acid; monoesters or monoamide compounds of difunctional cartoxylic acids such as oxalic acid, malonic acid, succinic acid, glutaric acid, adipic acid, pimelic acid, suberic acid, azelaic acid, sebacic acid, phthalic acid, isophthalic acid, terephthalic acid, oxyphthalic acid, chlorophthalic acid, aminophthalic acid, maleic acid, fumaric acid, citraconic acid, mesaconic acid, itaconic acid, aconitic acid and thiodipropionic acid; and di- or triester compounds of trifunctional or tetrafunctional carboxylic acids such as hemimellitic acid, trimellitic acid, mellophanic acid, pyromellitic acid and mellitic acid.

The amount of the above organic acid salt of zinc per 100 parts by weight of the halogen-containing resin is 0 to 2 parts by weight, preferably 0.05 to 1 part by weight, particularly preferably 0.1 to 0.5 part by weight. When the calcium compound of the formula (1) or (2) contains zinc, the organic acid salt of zinc can be omitted.

The halogen-containing resin composition of the present invention may contain a partially esterified polyhydric alcohol or a polyhydric alcohol. The polyhydric alcohol includes mannitol, xylitol, sorbitol, trimethylolpropane, pentaerythritol, dipentaerythritol, tripentaerythritol and glycerin. The partially esterified polyhydric alcohol can be obtained by reacting at least one of the above polyhydric alcohols with at least one mono or polycarboxylic acid. The mono or polycarboxylic acid includes acetic acid, lactic acid, 4-hydroxybutyric acid, malonic acid, succinic acid, maleic acid, adipic acid, glutaric acid, itaconic acid, malic acid, tartaric acid, citric acid, phthalic acid, isophthalic acid, terephthalic acid, trimellitic acid and pyromellitic acid. The amount of the partially esterified polyhydric alcohol or the polyhydric alcohol per 100 parts by weight of the halogen-containing resin is 0 to 2 parts by weight, preferably 0.1 to 1 part by weight.

Examples of the halogen-containing resin used in the present invention include chlorine-containing synthetic resins such as polyvinyl chloride, polyvinylidene chloride, chlorinated polyethylene, chlorinated polypropylene, chlorinated rubber, a vinyl chloride-vinyl acetate copolymer, a vinyl chloride-ethylene copolymer, a vinyl chloride-propylene copolymer, a vinyl chloride-styrene copolymer, a vinyl chloride-isobutylene copolymer, a vinyl chloride-vinylidene chloride copolymer, a vinyl chloride-styrene-maleic anhydride terpolymer, a vinyl chloride-styrene-acrylonitrile copolymer, a vinyl chloride-butadiene copolymer, a vinyl chloride-isoprene copolymer, a vinyl chloride-chlorinated propylene copolymer, a vinyl chloride-vinylidene chloride-vinyl acetate terpolymer, a vinyl chloride-acrylate copolymer, a vinyl chloride-maleate copolymer, a vinyl chloride-methacrylate copolymer, a vinyl chloride-acrylonitrile copolymer and copolymer of vinyl chloride and various vinyl ethers. Further, the halogen-containing resin also includes a blend, block copolymer and graft copolymer of at least two of the above chlorine-containing resins, and a blend, block copolymer or graft copolymer of at least one of the above chlorine-containing resins and other synthetic resin containing no chlorine.

The halogen-containing resin composition of the present invention may contain conventional additives. Examples of the additives include organic tin stabilizer such as dibutyltin maleate, di-n-octyltin mercapto, di-n-octyltin maleate, dibutyltin laurate and dibutyltin compounds; epoxy stabilizers such as epoxidized soybean oils, epoxidized oleic acid esters and epoxidized erucic acid esters; phosphorous acid esters such as tris(nonylphenyl)phosphite and hydrogenated 4,4'-isopropylidencdiphenolphosphite; sulfur-containing compound stabilizers such as thiodipropionic acid and diethylthiodipropionate; phenolic stabilizers such as alkyl gallate, alkylated phenol and styrenated phenol; α-amino acids such as glycine, alanine, leucine, isiteucine glycineamide, histidine ethyl ester and tryptophan benzyl ester; perchlorate stabilizers and initial coloring preventors such as barium perchlorate, calcium perchlorate and perchlorate ion type hydrotalcites; magnesium hydroxide solid solution-based stabilizers such as $(Mg)_{1-y}(Zn)_y(OH)_2$ in which $0.01 \leq y < 0.2$; magnesium oxide solid solution-based stabilziers such as $(Mg)_{1-y}(Zn)_yO$ in which $0.01 \leq y < 0.2$; and antioxidants such as styrenated p-cresol, 2,6-di-tert-butyl-4-methylphenol, butylated anisol, 4,4'-methylenebis (6-tert-butyl-3-methylphenol), 2,2'-methylenebis (6-tert-butyl-4-methylphenol), 1,3,5-trimethyl-2,4,6 -tris(3,5-di-tert-butyl-4-hydroxybenzyl)benzene and tetrakis [3-(4-hydroxy-3,5-di-tert-butylphenyl) propionyloxymethylene]methane.

The amount of the above additive is determined as required. For example, the amount of the stabilizers per 100 parts by weight of the halogen-containing resin is approximately 0.01 to 5 parts by weight. The amount of tile antioxidants per 100 parts by weight of the halogen-containing resin is approximately 0.01 to 2 parts by weight. The halogen-containing resin composition of the present invention may further contain conventional additives such as a plasticizer, a lubricant, a processing auxiliary, a weatherability improving agent, an antistatic agent, a nonfogging agent, a reinforcing material, a filler and a pigment.

In the present invention, the halogen-containing resin, the other components used in the present invention and other additives can be uniformly mixed and kneaded by a conventional method. For example, the mixing and kneading can be carried out with any one of a single screw or twin-screw extruder, a roll and a Banbury mixer. The halogen-containing resin composition of the present invention can be molded by any one of an injection molding method, an extrusion method, a blow molding method, a press molding method, a rotary molding method, a calender molding method, a sheet forming method, a transfer molding method, a lamination molding method and a vacuum molding method.

According to the present invention, there is provided a halogen-containing resin composition excellent in heat stability, chalking resistance, coloring properties and nontoxicity. Further, according to the present invention, there is provided a novel calcium-based composite metal oxide which can give a halogen-containing resin composition excellent in the above properties.

The present invention will be further detailed hereinafter with reference to Examples.

EXAMPLE 1

One liter of a slurry containing 1 mol/l of $Ca(OH)_2$ was placed in a beaker having a volume of 2 liters, and while the slurry was stirred, 400 ml of an aqueous solution (30° C.) containing 0.1 mol/l of $Zn(NO_3)_2$ was added. The resultant reaction product was filtered and washed with water to obtain a cake, and then the cake was dispersed in 1 liter of water. The dispersion was heated up to about 80° C., and while the dispersion was stirred, a solution of 1 g of sodium stearate in 100 ml of water (80° C.) was added to carry out the surface treatment. The resultant product was recovered by filtration, washed with water and dried. The dried product was analyzed for chemical composition, analyzed with X-ray, measured for a BET specific surface area and analyzed by a microtrack method for particle size distribution. The result of the analysis for chemical composition was as follows.

$Ca_{0.96}Zn_{0.04}(OH)_2$ 1.5 Parts by weight of the above dried product was kneaded together with the following components to prepare a resin composition.

| | |
|---|---|
| Polyvinyl chloride (average polymerization degree 700, supplied by Shin-Etsu Chemical Co., Ltd.) | 100 parts by weight |
| Stearoylbenzoylmethane (β-diketone) | 0.4 part by weight |
| Zinc stearate | 0.5 part by weight |
| Dipentaerythritol partially esterified with adipic acid | 0.3 part by weight |
| Montanic acid ester (lubricant) | 0.8 part by weight |

The above-obtained composition was kneaded with an open roll at 170° C. for 5 minutes and formed into a sheet. Then, a test piece having a size of 30 mm×30 mm was prepared from the sheet. The test piece was placed in a gear oven and measured for heat stability at 190° C. and initial coloring properties. The thermal stability was evaluated on the basis of the period of time (minute) required until the test piece turned black, and the initial coloring properties were evaluated on a color tone obtained after 10 minutes. Table 1 shows the results.

EXAMPLE 2

A dried product was obtained in the same manner as in Example 1 except that the aqueous solution containing $Zn(NO_3)_2$ was replaced with 800 ml of an aqueous solution containing 0.1 mol/l of $Cu(NO_3)_2$. This dried product was analyzed for a chemical composition to show as follows.

$Ca_{0.92}Cu_{0.08}(OH)_2$

The above product was measured for physical properties in the same manner as in Example 1. A resin composition was prepared from the above product, and evaluated for heat stability and a color tone, in the same manner as in Example 1. Table 1 shows the results.

EXAMPLE 3

A dried product was obtained in the same manner as in Example 1 except that the aqueous solution containing $Zn(NO_3)_2$ was replaced with 500 ml of an aqueous solution containing 0.2 mol/l of $MgCl_2$. This dried product was analyzed for a chemical composition to show as follows.

$Ca_{0.9}Mg_{0.1}(OH)_2$

The above product was measured for physical properties in the same manner as in Example 1. A resin composition was prepared from the above product, and evaluated for heat stability and a color tone, in the same manner as in Example 1. Table 1 shows the results.

EXAMPLE 4

In a nitrogen atmosphere, 500 ml of deoxidized water was placed in a beaker having a volume of 5 liters, and further deoxidized. Then, 2 liters of a calcium nitrate/manganese nitrate mixed aqueous solution ($Ca^{2+}$=1.7 mol/l, $Mn^{2+}$=0.3 mol/l, 30° C.) and 2 liters of a sodium hydroxide aqueous solution (4 mol/l, 30° C.) were simultaneously added with stirring, and the addition was completed in about 5 minutes. The resultant white precipitate was recovered by filtration and washed with water to give a cake. The cake was dispersed in 4 liters of water. The dispersion was heated up to about 60° C., and while the dispersion was stirred, a solution of 2 g of sodium oleate in water (about 60° C.) was added to carry out the surface treatment. The resultant product was recovered by filtration, washed with water and dried (All the procedures from the beginning to this drying were carried out in nitrogen atmosphere). The dried product was analyzed for a chemical composition, analyzed with X-ray, measured for a BET specific surface area and analyzed by a microtrack method for a particle size distribution. The result of the analysis for a chemical composition was as follows.

$Ca_{0.96}Mn_{0.04}(OH)_2$

The above product was measured for physical properties in the same manner as in Example 1. A resin composition was prepared from the above product, and evaluated for heat stability and color tone, in the same manner as in Example 1. Table 1 shows the results.

EXAMPLE 5

The same product as that which was obtained before the surface treatment in Example 2 was dried and pulverized. Then, the pulverized product was calcined in a silicon carbide furnace at 600° C. for 1 hour. Separately, isopropyltrisostcaroyl titanate in an amount of 1% by weight of the weight of the calcined product was dispersed in 200 ml of ethyl alcohol. This dispersion was gradually added to the calcined product with stirring. The resultant mixture was dried at 110° C. for 2 hours. The dried product was analyzed for chemical composition, analyzed with X-ray, measured for BET specific surface area and analyzed by a micro track method for particle size distribution. The above product was measured for physical properties in the same manner as in Example 1. A resin composition was prepared from the above product, and evaluated for heat stability and color tone, in the same manner as in Example 1. Table 1 shows the results.

COMPARATIVE EXAMPLES 1–3

Resin compositions were prepared in the same manner as in Example 1 except that the calcium-based compound obtained in Example 1 was replaced with calcium stearate (Comparative Example 1), which is a non-toxic stabilizer, barium stearate (Comparative Example 2), which is a stabilizer, or glycine copper (Comparative Example 3), which is a chalking preventer. These resin compositions were evaluated for color tones. Table 1 shows the results.

TABLE 1

| | Powder X-ray diffraction | BET specific surface area ($m^2/g$) | Average secondary particle diameter (μm) |
|---|---|---|---|
| Ex. 1 | $Ca(OH)_2$ | 8 | 0.92 |
| Ex. 2 | $Ca(OH)_2$ | 11 | 1.20 |
| Ex. 3 | $Ca(OH)_2$ | 13 | 0.87 |
| Ex. 4 | $Ca(OH)_2$ | 15 | 0.60 |
| Ex. 5 | CaO | 45 | 1.41 |
| CEx. 1 | — | — | — |
| CEx. 2 | — | — | — |
| CEx. 3 | — | — | — |

| | Heat resistance in oven | |
|---|---|---|
| | Heat stability (minute) | Color tone after 10 minutes |
| Ex. 1 | 70 | Colorless |
| Ex. 2 | 60 | Colorless |
| Ex. 3 | 60 | Light orange |
| Ex. 4 | 60 | Colorless |
| Ex. 5 | 60 | Colorless |
| CEx. 1 | — | Black |
| CEx. 2 | — | Orange |
| CEx. 3 | — | Black |

Ex. = Example, CEx. = Comparative Example

EXAMPLE 6

1.0 Part by weight of the same calcium-based solid solution as that obtained in Example I was kneaded together with the following components to prepare a resin composition.

| | |
|---|---|
| Polyvinyl chloride (average polymerization degree 700, supplied by Shin-Etsu Chemical Co., Ltd.) | 100 parts by weight |
| Dibenzoylmethane (β-diketone, supplied by Rhone Polenc, Inc.) | 0.2 part by weight |
| Zinc octoate | 0.2 part by weight |
| Dipentaerythritol | 0.3 part by weight |
| Castor wax (lubricant) | 1.5 parts by weight |
| Montanic acid ester (lubricant) | 0.5 part by weight |
| Epoxidized soybean oil | 0.5 part by weight |

The above-obtained composition was kneaded with a roll at 1.70° C. for 5 minutes and formed into a sheet. Then, The sheet was placed in a gear oven and measured for heat stability at 190° C. and initial coloring properties in the same manner as in Example 1. Table 2 shows the results.

EXAMPLES 7 AND 8, AND COMPARATIVE EXAMPLE 4

Resin compositions were prepared in the same manner as in Example 6 except that the calcium-based solid solution was replaced with the same calcium-based solid solution as that obtained in Example 2 (Example 7), with a product obtained by preparing the same product ($Ca_{0.96}Zn_{0.04}(OH)_2$) as that which was obtained before the surface treatment in Example 1 and calcining it at 600° C. for 1 hour (Example 8, $Ca_{0.96}Zn_{0.04}O$), or with calcium stearate (Comparative Example 4). These resin compositions were formed into sheets, and the sheets were evaluated for heat stability and color tone, in the same manner as in Example 6. Table 2 shows the results.

TABLE 2

| | Heat resistance in oven | |
|---|---|---|
| | Heat stability (minute) | Color tone after 10 minutes |
| Ex. 6 | 70 | Colorless |
| Ex. 7 | 60 | Colorless |
| Ex. 8 | 70 | Colorless |
| CEx. 4 | 10 | Light orange |

Ex. = Example, CEx. = Comparative Example

What is claimed is:

1. A halogen-containing resin composition comprising
   (a) 0.1 to 10 parts by weight of at least one of a calcium-based composite metal hydroxide of the formula (1), $$Ca_{1-x}M^{2+}{}_x(OH)_2 \qquad (1)$$

wherein $M^{2+}$ is at least one divalent metal ion selected from the group consisting of $Mg^{2+}$, $Mn^{2+}$, $Fe^{2+}$, $Co^{2+}$, $Ni^{2+}$, $Cu^{2+}$ and $Zn^{2+}$ and x is a number in the range of $0.005<x<0.5$ and a calcium-based composite metal oxide of the formula (2), $$Ca_{1-x}M^{2+}{}_xO \qquad (2)$$

wherein $M^{2+}$ and x are as defined in the formula (1),
   (b) 0.01 to 2 parts by weight of a β-diketone compound or a metal salt thereof,
   (c) 0 to 2 parts by weight of an organic acid salt of zinc, and
   (d) 100 parts by weight of a halogen-containing resin derived from an ethylenically unsaturated monomer.

2. A composition according to claim 1, wherein the composition further contains up to 2 parts by weight of a polyhydric alcohol or an ester of a polyhydric alcohol.

3. A composition according to claim 1, wherein the β-diketone compound has the formula (3), $$R_1-CO-CHR_2-CO-R_3$$

wherein each of $R_1$ and $R_3$ is independently a linear or branched alkyl or alkenyl group having up to 30 carbon atoms, an aryl group or an alicyclic group which may contain a carbon-carbon double bond, one of $R_1$ and $R_3$ may be a hydrogen atom, and $R_2$ is a hydrogen atom, an alkyl group or an alkenyl group.

4. A composition according to claim 1, wherein the composition contains 0.001 to 5 parts by weight of a tin-based stabilizer in place of the β-diketone compound.

5. A composition according to claim 1, wherein $M^{2+}$ in each of the formulae (1) and (2) is at least one member selected from the group consisting of $Mg^{2+}$, $Zn^{2+}$ and $Cu^{2+}$.

6. A composition according to claim 1, wherein the composite metal hydroxide of the formula (1) and the composite metal oxide of the formula (2) are products prepared by surface treatment with at least one member selected from the group consisting of higher fatty acid salts, phosphate eaters, silane-, titanium and aluminum-coupling agents, esters of polyhydric alcohols and fatty acids, and metal salts of higher fatty acids.

7. A composite metal oxide which is a calcium oxide-containing solid solution having the formula (2), $$Ca_{1-x}M^{2+}{}_xO \qquad (2)$$

wherein $M^{2+}$ is at least one divalent metal ion selected from the group consisting of $Mg^{2+}$, $Mn^{2+}$, $Fe^{2+}$, $Co^{2+}$, $Ni^{2+}$, $Cu^{2+}$ and $Zn^{2+}$ and x is a number in the range of $0.005<x<0.5$ and having a BET specific surface area ranging from 5 to 300 $m^2/g$.

8. A process for the production of a composite metal oxide which is a calcium oxide-containing solid solution of the formula (2), $$Ca_{1-x}M^{2+}{}_xO \qquad (2)$$

wherein $M^{2+}$ is at least one divalent metal ion selected from the group consisting of $Mg^{2+}$, $Mn^{2+}$, $Fe^{2+}$, $Co^{2+}$, $Ni^{2+}$, $Cu^{2+}$ and $Zn^{2+}$ and x is a number in the range of $0.005<x<0.5$ which comprises calcining a calcium hydroxide-containing solid solution of the formula (1), $$Ca_{1-x}M^{2+}{}_x(OH)_2 \qquad (1)$$

wherein $M^{2+}$ and x are as defined in the formula (2), at a temperature between 400° C. and 1,100° C.

* * * * *